US011395151B2

(12) United States Patent
Tiwari et al.

(10) Patent No.: US 11,395,151 B2
(45) Date of Patent: Jul. 19, 2022

(54) ANALYZING A COMMUNICATION NETWORK DEVICE, BASED ON COVERAGE ANALYSES ASSOCIATED WITH DECOMMISSIONING THE COMMUNICATION NETWORK DEVICE, TO DETERMINE NEXT ACTIONS FOR 5G ROLLOUT

(71) Applicant: Accenture Global Solutions Limited, Dublin (IE)

(72) Inventors: Sanjay Tiwari, Bengaluru (IN); Mayur Kolhe, Bengaluru (IN); Chetan Thukral, Bengaluru Karnataka (IN); Mohit Mahajan, Gurugram (IN); Anshul Kapoor, Delhi (IN); Juhi Mandot, Udaipur (IN); Shantha Maheswari, Bangalore (IN); Mathangi Sandilya, Bangalore (IN)

(73) Assignee: Accenture Global Solutions Limited, Dublin (IE)

(*) Notice: Subject to any disclaimer, the term of this patent is extended or adjusted under 35 U.S.C. 154(b) by 42 days.

(21) Appl. No.: 16/902,018

(22) Filed: Jun. 15, 2020

(65) Prior Publication Data
US 2021/0345127 A1    Nov. 4, 2021

(30) Foreign Application Priority Data
Apr. 30, 2020 (IN) .......................... IN202041018566

(51) Int. Cl.
*H04W 16/18* (2009.01)

(52) U.S. Cl.
CPC .................. *H04W 16/18* (2013.01)

(58) Field of Classification Search
CPC ..... H04W 40/12; H04W 16/18; H04W 16/22; H04W 24/02; H04W 24/04; H04W 24/06; H04W 84/18
See application file for complete search history.

(56) References Cited

U.S. PATENT DOCUMENTS

| 9,585,036 B1* | 2/2017 | Tektumanidze | H04W 24/04 |
| 2003/0087641 A1* | 5/2003 | Gustafsson | H04W 16/18 455/446 |
| 2014/0355484 A1* | 12/2014 | Foster | H04W 16/18 370/255 |
| 2015/0155996 A1* | 6/2015 | Garcia | H04L 5/0053 370/329 |

* cited by examiner

*Primary Examiner* — Marcos L Torres
(74) *Attorney, Agent, or Firm* — Harrity & Harrity, LLP

(57) ABSTRACT

A device may receive site data identifying a site associated with a telecommunications network. The device may receive RF drive test data identifying signal strengths of the site at different location points. The device may receive network KPI data and throughput data associated with the site. The device may assign unique identifiers to the different location points. The device may determine, based on the site data, the RF drive test data, the network KPI data, and the unique identifiers, at least one of reference signal strength data for each of the different location points or downlink channel data for each of the different location points. The device may determine degraded signal strength data identifying a degraded signal strength of each of the different location points, if the site is decommissioned and based on the at least one of the reference signal strength data or the downlink channel data.

20 Claims, 13 Drawing Sheets

ANALYZING A COMMUNICATION NETWORK DEVICE, BASED ON COVERAGE ANALYSES ASSOCIATED WITH DECOMMISSIONING THE COMMUNICATION NETWORK DEVICE, TO DETERMINE NEXT ACTIONS FOR 5G ROLLOUT

CROSS-REFERENCE TO RELATED APPLICATION

This application claims priority to Indian Provisional Application No. 202041018566 entitled, "ANALYZING A COMMUNICATION NETWORK DEVICE, BASED ON COVERAGE ANALYSES AND AFTER DECOMMISSIONING THE COMMUNICATION NETWORK DEVICE, TO DETERMINE NEXT BEST ACTIONS," filed on Apr. 30, 2020. The entire content of which is expressly incorporated herein by reference.

BACKGROUND

A telecommunication network (e.g., a cellular network) may be distributed over coverage areas or sites that can extend over a wide geographic area and enable a large number of user equipment (e.g., computers, smart phones, Internet-of-Things (IoT) devices, and/or the like) to communicate. A site of the telecommunication network may include one or more network devices (e.g., a baseband unit, a base station, a router, a modem, a switch, a gateway, an access point, and/or another network device) that enable the user equipment to connect to the telecommunications network.

SUMMARY

According to some implementations, a method may include receiving, by a device, site data identifying a site associated with a telecommunications network; receiving, by the device, radio frequency (RF) drive test data identifying signal strengths of the site at different location points relative to a location of the site; receiving, by the device, network key performance indicator (KPI) data identifying accessibility data, availability data, and throughput data associated with the site; assigning, by the device, unique identifiers to the different location points identified in the RF drive test data; determining, by the device and based on the site data, the RF drive test data, the network KPI data, and the unique identifiers, at least one of reference signal strength data identifying a reference signal strength of each of the different location points or downlink channel data identifying a downlink channel throughput of each of the different location points; determining, by the device, degraded signal strength data identifying a degraded signal strength of each of the different location points, if the site is decommissioned and based on the at least one of the reference signal strength data or the downlink channel data; and performing, by the device, one or more actions based on the degraded signal strength data.

According to some implementations, a device may include one or more memories and one or more processors. In some implementations, the one or more processors are communicatively coupled to the one or more memories. The one or more processors may be configured to: receive site data identifying a site associated with a telecommunications network; receive radio frequency (RF) drive test data identifying signal strengths of the site at different location points relative to a location of the site; receive network key performance indicator (KPI) data identifying accessibility data, availability data, and throughput data associated with the site; assign unique identifiers to the different location points identified in the RF drive test data; determine a signal quality category for each of the different location points based on the site data, the RF drive test data, the network KPI data, and the unique identifiers; determine, based on the site data, the RF drive test data, the network KPI data, the unique identifiers, and the signal quality category for each of the different location points, at least one of reference signal strength data identifying a reference signal strength of each of the different location points or downlink channel data identifying a downlink channel throughput of each of the different location points; determine degraded signal strength data identifying a degraded signal strength of each of the different location points, if the site is decommissioned and based on the at least one of the reference signal strength data or the downlink channel data; and perform one or more actions based on the degraded signal strength data.

According to some implementations, a non-transitory computer-readable medium may store one or more instructions. The one or more instructions, when executed by one or more processors of a device, may cause the one or more processors to: receive site data identifying a site associated with a telecommunications network; receive radio frequency (RF) drive test data identifying signal strengths of the site at different location points relative to a location of the site, wherein the RF drive test data includes data identifying one or more of: reference signal receive powers of the site at the different location points, signal-to-interference-plus-noise ratios of the site at the different location points, or received signal strength indicators of the site at the different location points; receive network key performance indicator (KPI) data identifying accessibility data, availability data, and throughput data associated with the site; assign unique identifiers to the different location points identified in the RF drive test data; determine, based on the site data, the RF drive test data, the network KPI data, and the unique identifiers, at least one of reference signal strength data identifying a reference signal strength of each of the different location points or downlink channel data identifying a downlink channel throughput of each of the different location points; determine degraded signal strength data identifying a degraded signal strength of each of the different location points, if the site is decommissioned and based on the at least one of the reference signal strength data or the downlink channel data; and perform one or more actions based on the degraded signal strength data.

DETAILED DESCRIPTION

Figure 1A:
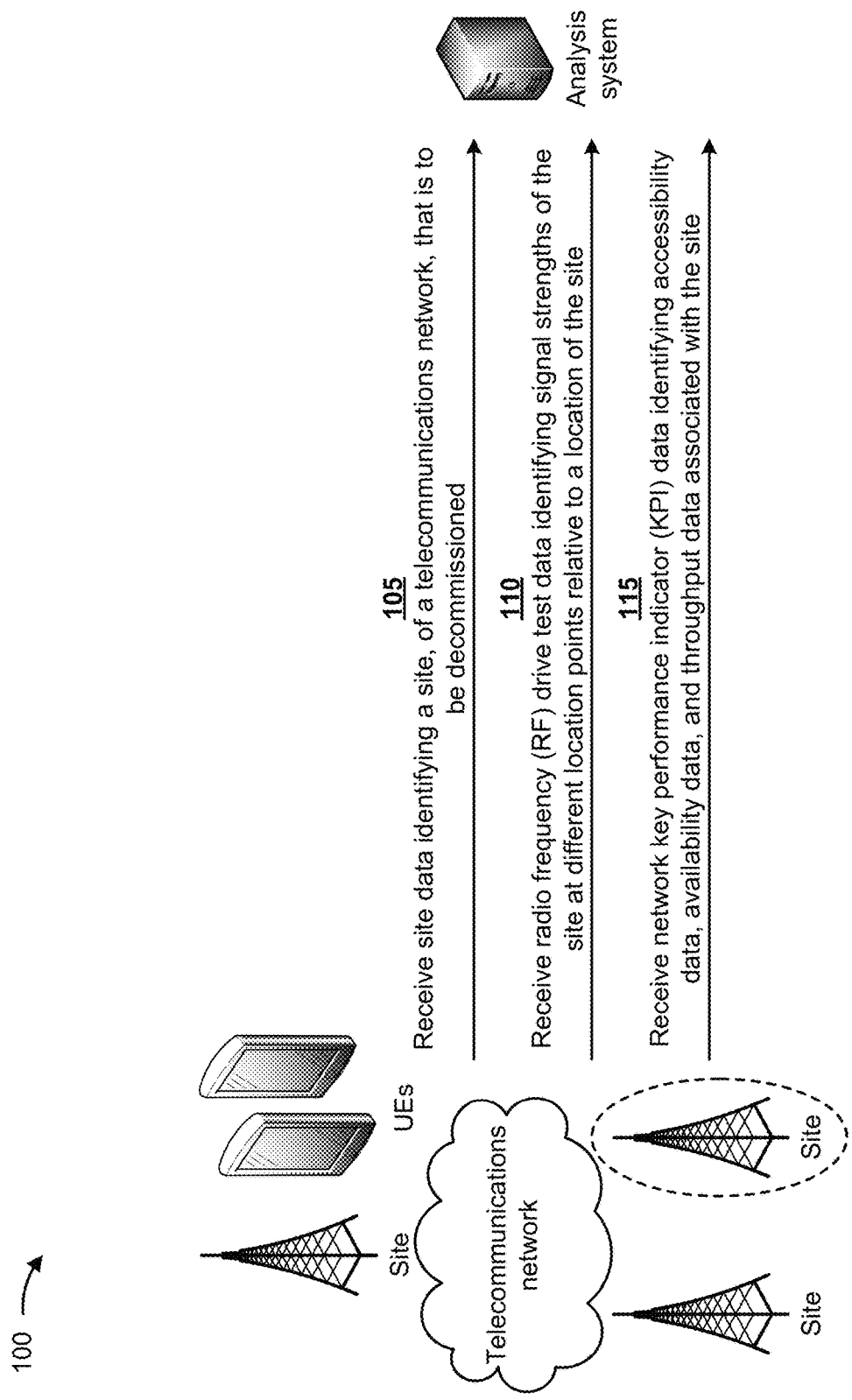
FIGS. 1A-1J are diagrams of one or more example implementations described herein.

The following detailed description of example implementations refers to the accompanying drawings. The same reference numbers in different drawings may identify the same or similar elements.

A telecommunication network may provide network services (e.g., telecommunications services, Internet services, and/or the like) for customers based on a requirement and a specification of the telecommunication network. For example, the telecommunication network may include a plurality of sites for providing high priority voice and real time video traffic together and/or various forms of high and low priority data traffic. Each of the sites may include one or more network devices (e.g., a baseband unit, a base station, a router, a modem, a switch, a gateway, an access point, and/or another network device) that enable the one or more network devices to connect to the network.

In some instances, a network provider, a third party, and/or the like may determine to decommission a site included in the telecommunication network. The network provider may collect data and monitor factors of the telecommunication network relating to a user's quality of experience (QoE) and/or a quality of service (QoS) provided to the user to determine a level of user satisfaction with the telecommunication network and/or a service of the telecommunication network (e.g., the user's network experience). The network provider may desire to decommission the site without negatively affecting services and/or a quality of those services provided by the telecommunication network (e.g., without negatively affecting a user's network experience).

However, the amount of data collected by the network provider is extremely large thereby making it difficult for the network provider to determine an effect decommissioning the site will have on the user's network experience. Large amounts of computer resources (e.g., processing resources, memory resources, communication resources, and/or the like) and/or human resources may be utilized to analyze the data. As such, current techniques for determining the effect decommissioning the site will have on the user's network experience and determining actions to be taken to provide the same or better network experience to users after the site is decommissioned are inefficient and ineffective.

In some implementations described herein an analysis system analyzes a site, based on coverage analyses associated with decommissioning the site, to determine one or more actions for providing the same or better network experience after the site is decommissioned. For example, the analysis system may obtain coverage analysis data associated with the site. The analysis system may process the coverage analysis data to identify the coverage analysis data associated with different locations within a coverage area of the site. The analysis system may determine a degraded signal strength for the different locations based on the processed coverage analysis data. The analysis system may determine one or more actions for providing the same or better network experience to users after the site is decommissioned based on the degraded signal strength determined for the different locations.

In this way, the analysis system may efficiently and effectively analyze the large amounts of data obtained by a network provider to determine an effect decommissioning a site will have on a user's network experience and actions to be taken to provide the same or better network experience to users after a site is decommissioned. Thus, the analysis system may utilize fewer computing resources, networking resources, human resources, and/or the like relative to other systems used to determine the effect decommissioning a site will have on a user's network experience and actions to be taken to provide the same or better network experience to users after the site is decommissioned.

FIGS. 1A-1J are diagrams of one or more example implementations 100 described herein. As shown in FIGS. 1A-1J, example implementation(s) 100 may include an analysis system, user equipment, and a site. The analysis system may analyze a site, based on coverage analyses associated with decommissioning the site, to determine one or more actions to be taken to provide the same or better network experience to users of a network.

In some implementations, the analysis system analyzes the site based on coverage analysis data associated with the site. In some implementations, the analysis system obtains one or more portions of the coverage analysis data from the site. The analysis system may transmit a request for the one or more portions of the coverage analysis data to the site. The site may receive the request and may provide the one or more portions of the coverage analysis data to the analysis system.

In some implementations, the analysis system obtains one or more portions of the coverage analysis data from a data structure (e.g., a database, a table, a list, and/or the like). The data structure may be stored in a memory of a network device (e.g., a server device) associated with the communications network. The analysis system may query the data structure and may obtain one or more portions of the coverage analysis data based on querying the data structure.

In some implementations, one or more portions of the coverage analysis data may be input by a user. For example, a user may obtain one or more portions of the coverage analysis data and may utilize a client device (e.g., a computer, a tablet, a smart phone, and/or the like) to input the one or more portions of the coverage analysis data to the analysis system.

In some implementations, the analysis system obtains the coverage analysis data based on determining that the site is to be decommissioned. The analysis system may determine that the site is to be decommissioned based on information input by a user, information received from the site, and/or the like. The analysis system may obtain the coverage analysis data based on determining that the site is to be decommissioned.

In some implementations, the analysis system obtains the coverage analysis data periodically. For example, the analysis system may obtain the coverage analysis data hourly, daily, weekly, and/or the like.

In some implementations, the coverage analysis data includes site data. As shown in FIG. 1A, and by reference number 105, the analysis system receives site data identifying a site, of a telecommunications network, that is to be decommissioned. The site data may include information indicating a location of the site, a configuration of the site, parameters utilized by the site, and/or the like. For example, the site data may include information identifying a site identifier associated with the site, a location of the site (e.g., latitude, longitude, and/or the like), an antenna identifier associated with the site, a height of the site, an azimuth associated with the site (e.g., an angle at which an antenna is directed), a mechanical tilt associated with the site (e.g., an angle at which an antenna is tilted with respect to a horizontal plane), an elevation associated with the location of the site, and/or the like. The above-list of information included in the site data is intended to be merely examples of types of information that may be included in the site data. In practice, the site data may include any one or more of the above-listed information and/or one or more other types of information not listed above.

In some implementations, the analysis system obtains the site data based on combined site data. The combined site data may be associated with a plurality of sites included in the telecommunications network. The analysis system may process the combined site data to obtain the site data associated with the site.

In some implementations, the coverage analysis data includes radio frequency (RF) drive test data. As shown by reference number 110, the analysis system receives RF drive test data identifying signal strengths of the site at different location points relative to a location of the site. A RF drive test may measure and/or assess a coverage, capacity, and/or quality of service (QoS) associated with the site at the different location points. In some implementations, the RF drive test data is obtained using a vehicle having mobile radio network air interface measurement equipment. The mobile radio network air interface measurement equipment may include one or more devices for detecting and/or recording various physical and/or virtual parameters associated with mobile cellular service in a given geographical area (e.g., a coverage area of the site). For example, the mobile radio network air interface measurement equipment may include a computing device (e.g., a laptop computer with RF drive test software installed thereon), a mobile phone, a GPS, a scanner, and/or the like. The vehicle may travel through the geographical area and may obtain the RF drive test data at the different location points.

The RF drive test data may be an estimated measure of power level that user equipment (UE) receives from the site at the different location points. The RF drive test data for the site at a location point may include data identifying a reference signal receive power (RSRP) of the site at the location point, a signal-to-interference-plus-noise ratio (SINR) of the site at the location point, a received signal strength indicator (RSSI) of the site at the location point, and/or the like.

In some implementations, the coverage analysis data includes network key performance indicator (KPI) data. As shown by reference number 115, the analysis system receives network KPI data identifying accessibility data, availability data, and throughput data associated with the site. The network KPI data may include information identifying one or more KPIs for the telecommunication network and respective values for the one or more KPIs. For example, the KPI data may include data indicating an average quantity of active network users, an average downlink network throughput, a network availability metric, an uplink traffic volume, a total data volume, a total amount of traffic associated with the telecommunication and/or the site, data indicating a site downlink throughput, data indicating a site uplink throughput, data indicating a downlink user throughput, data indicating an uplink user throughput, and/or the like. The above-listed KPIs are intended to be merely examples of types of KPIs that may be used. In practice, the KPIs may include any one or more of the above-listed KPIs and/or one or more other types of KPIs not listed above. and/or the like.

Figure 1B:
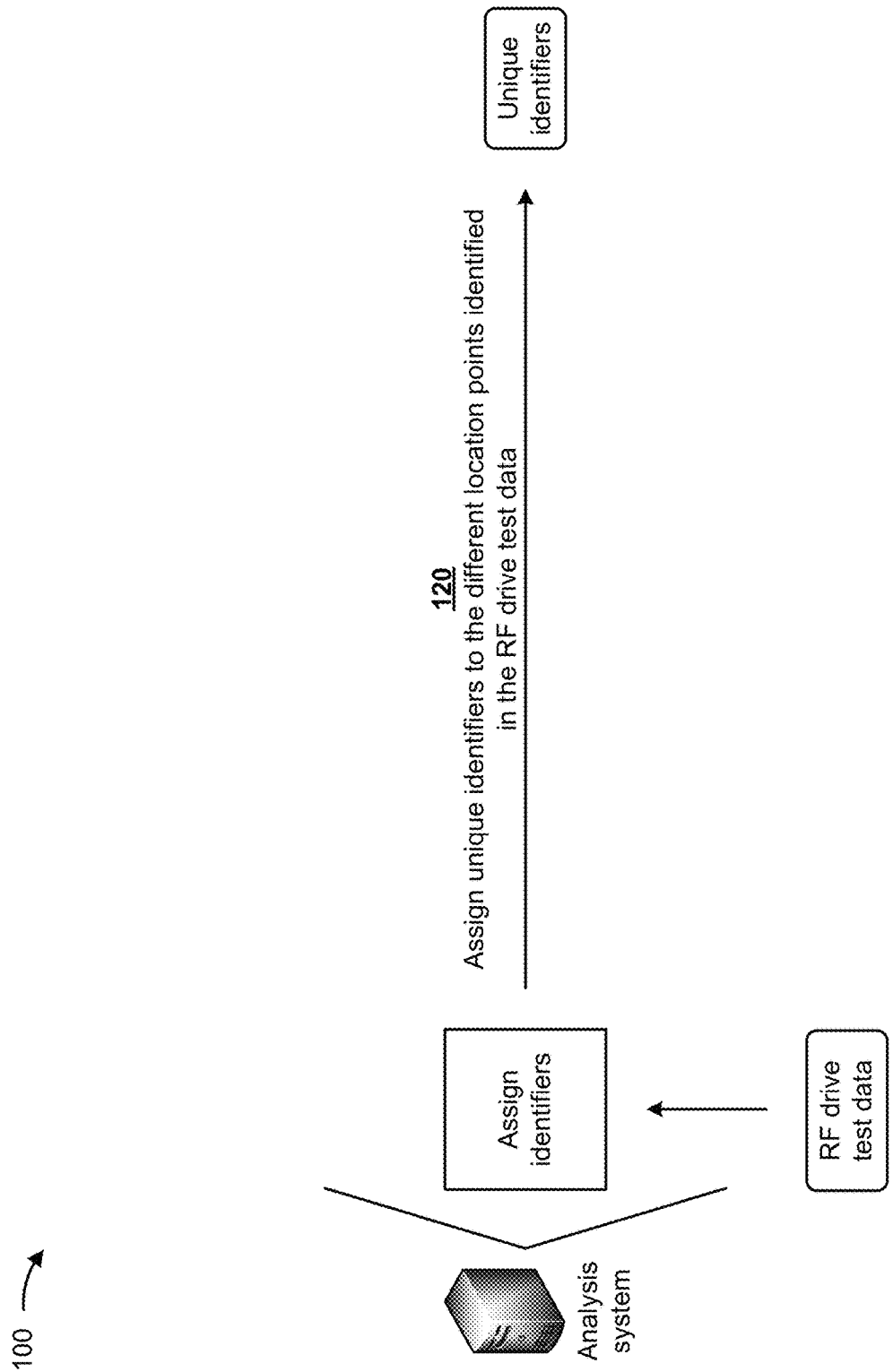

In some implementations, the analysis system analyzes the coverage analysis data associated with a particular geographical location within a coverage area of the site. The analysis system may analyze the RF drive test data to identify locations at which the RF drive test data was obtained. As shown in FIG. 1B, and by reference number 120, the analysis system assigns unique identifiers to the different location points identified in the RF drive test data. The different location points may correspond to the locations at which the RF drive test data was obtained.

Figure 1C:
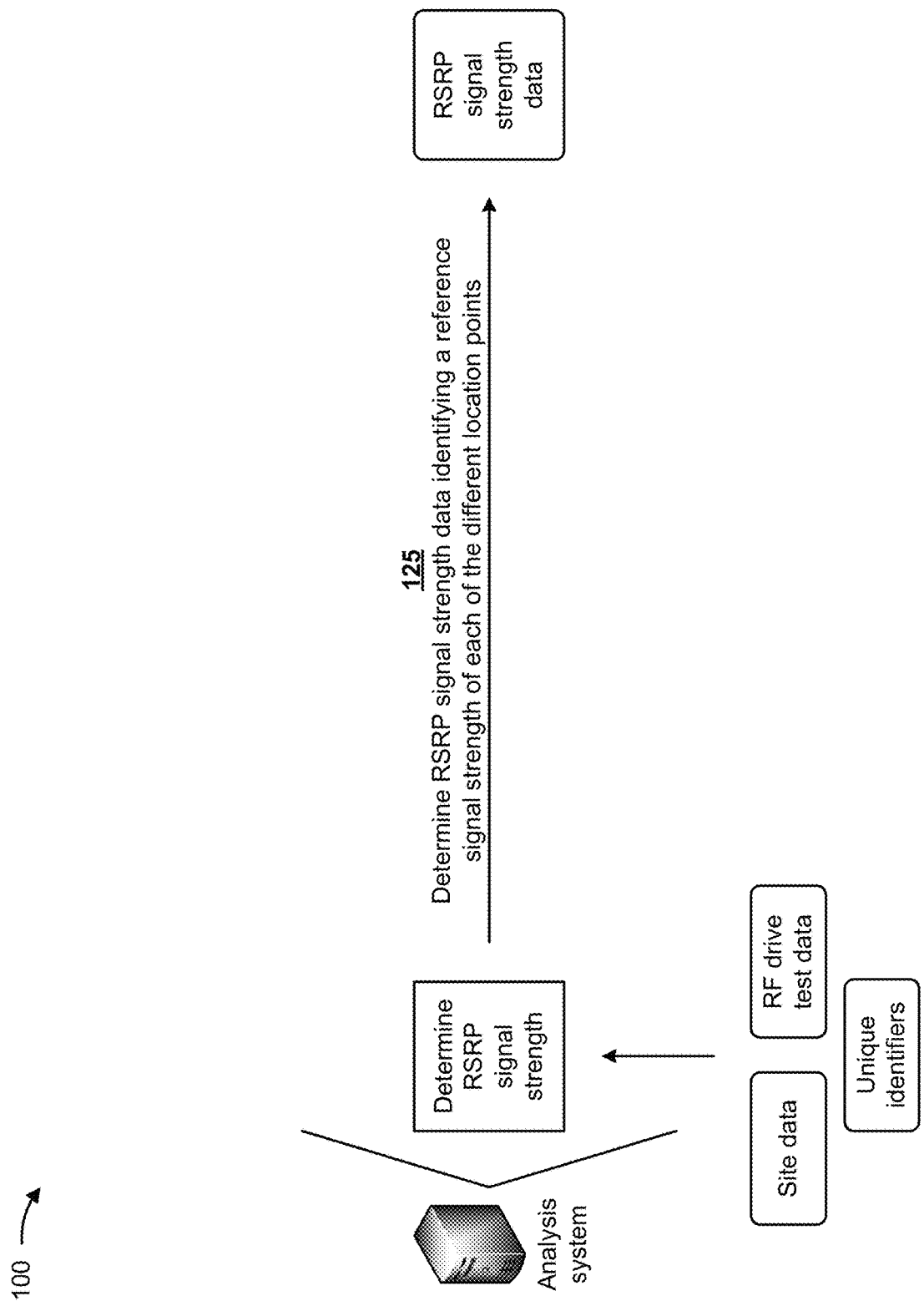

As shown in FIG. 1C, and by reference number 125, the analysis system determines RSRP signal strength data identifying a reference signal strength of each of the different location points. The analysis system may determine the RSRP measured at each of the different location points. The RSRP may be a measurement of the average power received from a single reference signal. The analysis system may determine a respective RSRP value associated with the unique identifier of each of the different location points.

The analysis system may categorize the RSRP signal strength data for different frequencies. The analysis system may categorize the RSRP signal strength data based on determining whether the reference signal strength of each of the different location points satisfies one or more thresholds indicating qualities of signal strength.

The analysis system may categorize the reference signal strength based on the RSRP value measured at a location point. In some implementations, the analysis system categorizes the reference signal strength for each frequency band or spectrum (e.g., 800 MHz, 1.5 GHz, 2 GHz, and/or the like) associated with the site. For example, the analysis system may associate the reference signal strength with a first category (e.g., excellent, first, and/or the like) for a first frequency band (e.g., 800 MHz) when the RSRP value satisfies a first threshold (e.g., RSRP≥−97 dBm), the analysis system may associate the reference signal strength with a second category (e.g., bad, last, and/or the like) when the RSRP value fails to a second threshold (e.g., RSRP<−125 dBm), and/or the like.

Figure 1D:
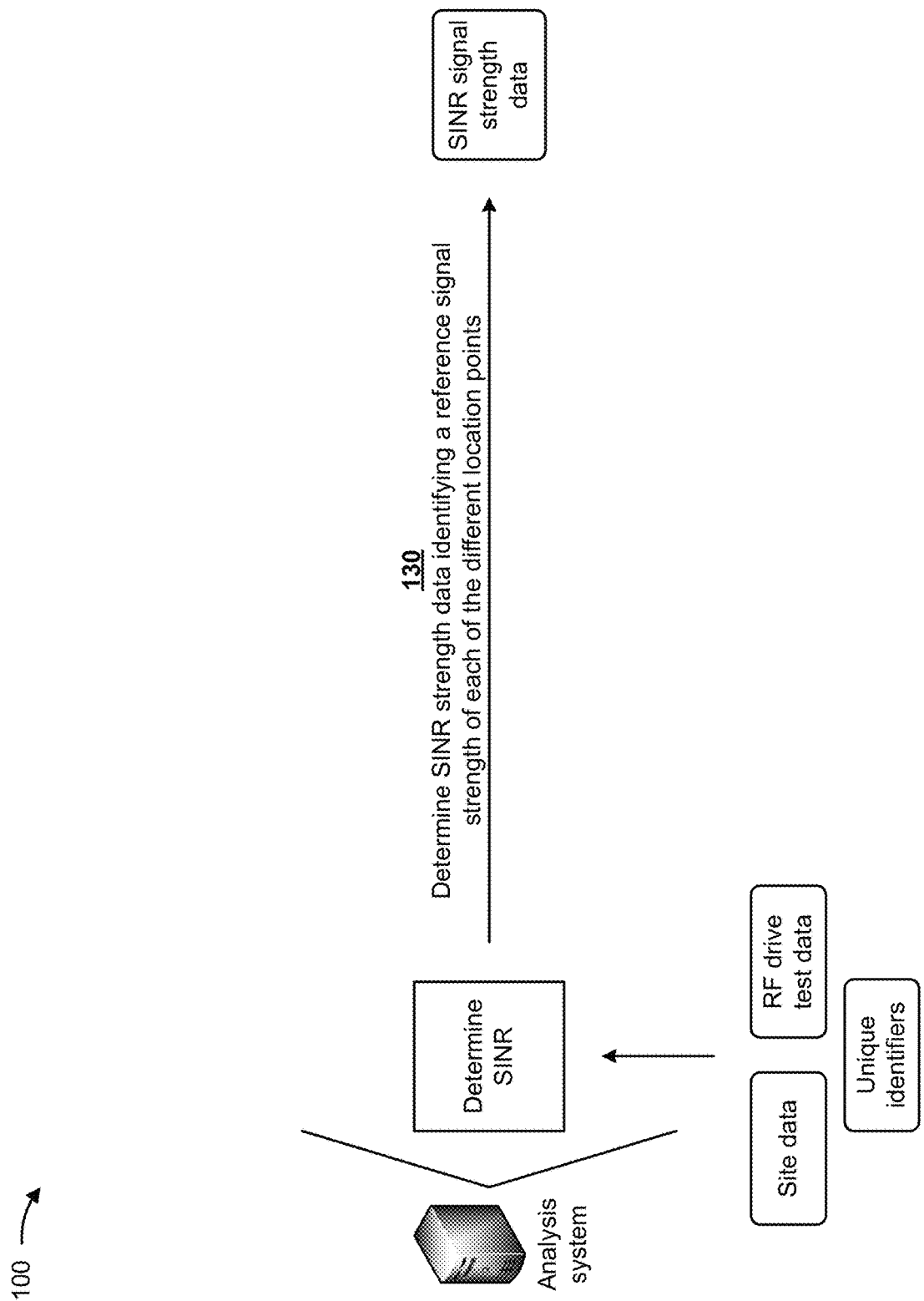

As shown in FIG. 1D, and by reference number 130, the analysis system determines SINR strength data identifying a reference signal strength of each of the different location points. The RF test drive data may include information indicating the downlink channel throughput of each of the different location points, such as a carrier-to-noise-and-interference ratio (C/N+I), SINR, and/or the like. The analysis system may analyze the RF test drive data to determine the reference signal strength at each of the different location points.

The analysis system may categorize the SINR strength data for different frequencies. The analysis system may determine whether the reference signal strength of each of the different location points satisfies one or more thresholds indicating qualities of channel throughput. The analysis system may categorize the SINR strength data based on determining whether the reference signal strength of each of the different location points satisfies one or more thresholds indicating qualities of channel throughput.

As an example, the analysis system may determine a carrier-to-noise-and-interference ratio (C/N+I) associated with the downlink channel at each of the different location points based on the RF drive test data. The C/N+I may be the ratio of the received modulated carrier signal power (C) to the sum of the noise power (N) and the average received co-channel interference power (I). The analysis system may categorize a signal quality of the downlink channel at a location point based on the C/N+I determined for the downlink channel at the location point. For example, the analysis system may determine that a signal quality of the downlink channel is associated with a first category (e.g., excellent) when the C/N+I value satisfies a first threshold (e.g., C/N+I>15 dBm), and may determine that the signal quality is associated with a second category (e.g., bad) when the C/N+I value satisfies a second threshold (e.g., −4 dBm≥C/N+I), and/or the like.

Figure 1E:
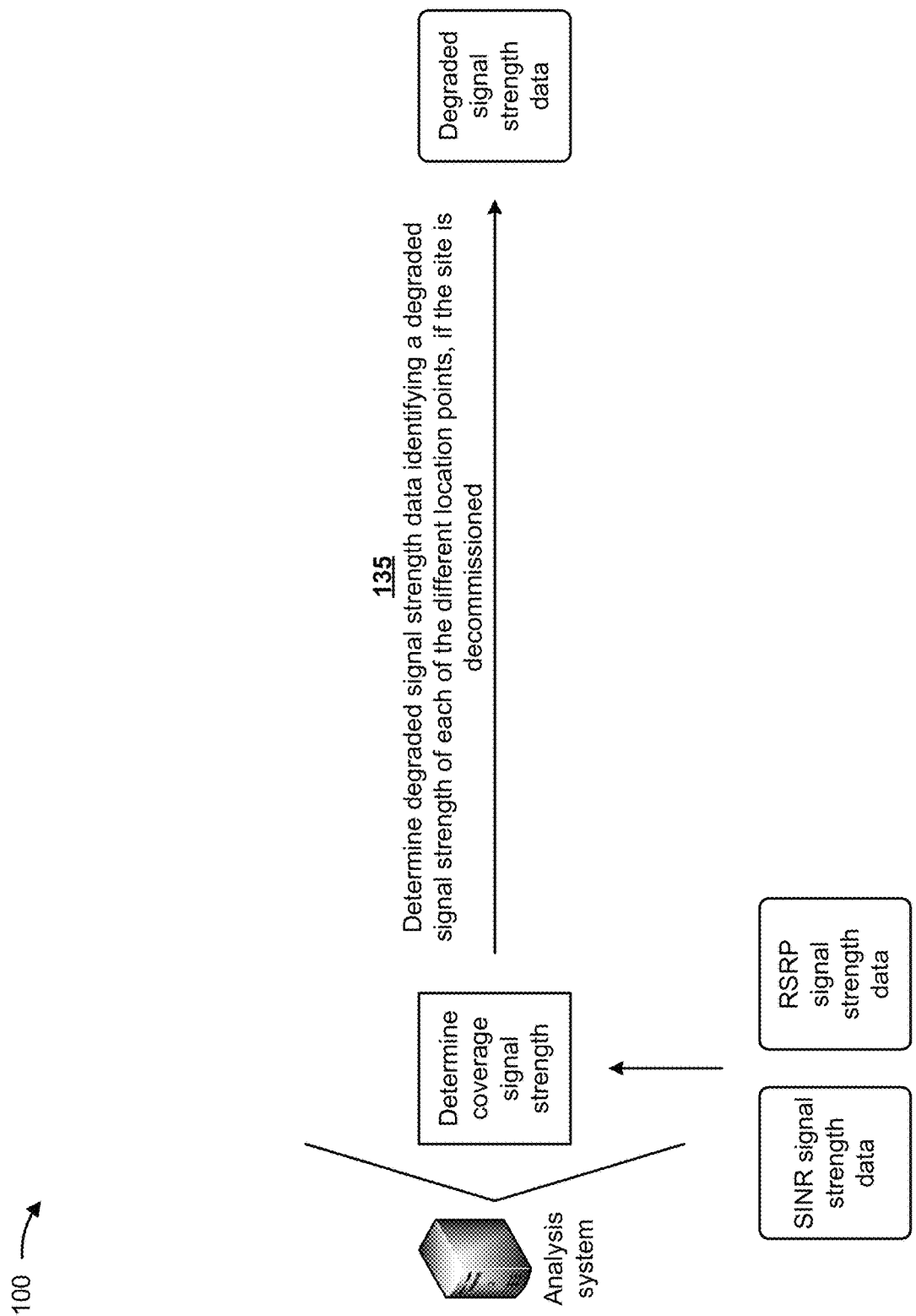

As shown in FIG. 1E, and by reference number 135, the analysis system determines degraded signal strength data identifying a degraded signal strength of each of the different location points, if the site is decommissioned. The analysis system may determine whether the RF test drive data includes information identifying a signal strength measured at a location point, of the one or more different location points, for a signal transmitted by another site. The analysis system may determine the degraded signal strength data based on whether the RF test drive data includes information identifying the signal strength measured at the location point for a signal transmitted by another site.

The degraded signal strength data may indicate that no signal will be available at the location point if the site is decommissioned when the RF test drive data does not include information identifying a signal strength measured at the location point for a signal transmitted by another site. When the RF test drive data does include information identifying a signal strength measured at the location point for a signal transmitted by another site, the degraded signal strength data may include information indicating the signal strength measured for the signal transmitted by the other site, information indicating a difference between the reference signal strength for the site and the signal strength measured for the signal transmitted by the other site, and/or the like.

In some implementations, the analysis system performs a distribution assessment based on the degraded signal strength data. The analysis system may generate a graph of the degraded signal strength data that indicates a degraded signal strength of a signal received at the one or more different location points. The graph may enable geographic areas associated with a degraded signal strength based on the site being decommissioned to be quickly and easily identified thereby conserving computing resources that may otherwise be utilized to identify geographic areas associated with a degraded signal strength based on the site being decommissioned.

Figure 1F:
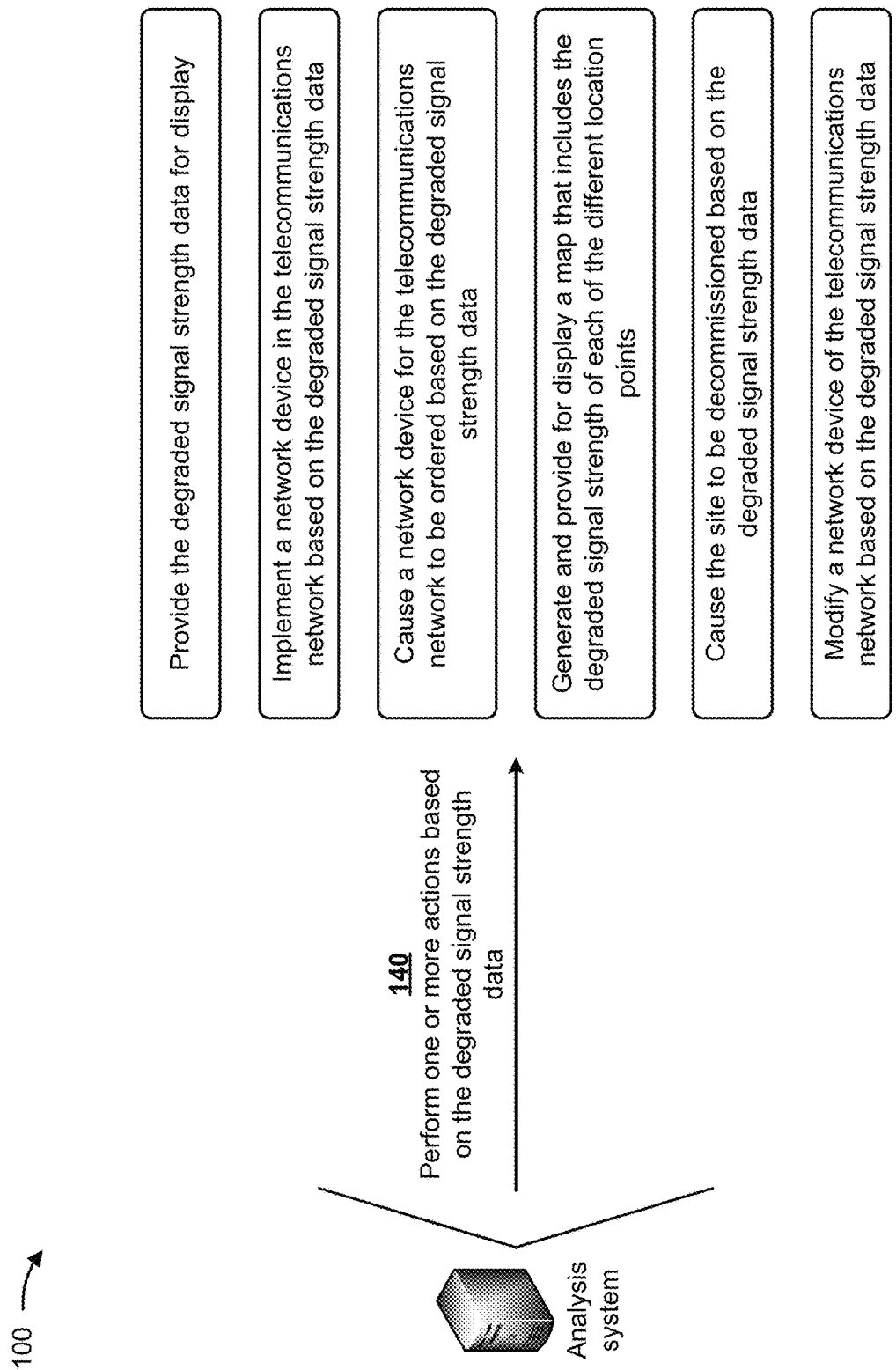

As shown in FIG. 1F, and by reference number 140, the analysis system performs one or more actions based on the degraded signal strength data. In some implementations, the one or more actions include providing the degraded signal strength data for display. In some implementations, the one or more actions include generating and providing for display a map that includes the degraded signal strength of each of the different location points. The map may enable an operator to quickly and efficiently determine the degraded signal strength of each of the different location points if the site is decommissioned.

In some implementations, the one or more actions include implementing a network device in the telecommunications network and/or causing a network device to be ordered based on the degraded signal strength data. The analysis system may determine to implement a network device in the telecommunications network to provide coverage for one or more locations associated with the degraded signal strength data. The analysis system may cause the network device is to be implemented by activating, ordering, installing, and/or the like the network device in the telecommunications network.

In some implementations, the one or more actions include causing the site to be decommissioned based on the degraded signal strength data. The degraded signal strength data may include information indicating that the one or more different location positions are not associated with a degraded signal strength if the site is decommissioned. The analysis system may determine that the site is to be decommissioned based on the degraded signal strength data including information indicating that the one or more different location positions are not associated with a degraded signal strength if the site is decommissioned. The analysis system may provide a notification indicating that the site is to be decommissioned (e.g., to a user) to cause the site to be decommissioned.

In some implementations, the one or more actions include modifying a network device of the telecommunications network based on the degraded signal strength data. The analysis system may identify a network device that can be modified to provide additional coverage to one or more of the different locations based on the degraded signal strength data. The analysis system may cause the network device to be modified based on determining that the network device can be modified to provide the additional coverage. For example, the analysis system may cause a position of an antenna of the network device to be altered (e.g., moved horizontally, moved vertically, and/or the like), may cause a power output of the network device to be modified (e.g., increased to improve a signal strength at a location point, decreased to reduce interference, and/or the like), may cause additional equipment to be installed on the network device (e.g., to increase a capacity of the network device, to increase a coverage area of the network device, and/or the like), and/or the like. In this way, the analysis system may allow a telecommunications network to be modified automatically thereby conserving computing resources, human resources, and/or the like.

FIGS. 1G-1J describe one or more processes associated with performing a capacity analysis associated with decommissioning the site. The capacity analysis may determine an effect of decommissioning the site on a capacity of the telecommunications network. The analysis system may perform the capacity analysis based on capacity data associated with the site.

In some implementations, the capacity data includes site data. In some implementations, the analysis system obtains the site data in a manner similar to that discussed above with respect to FIG. 1A.

Figure 1G:
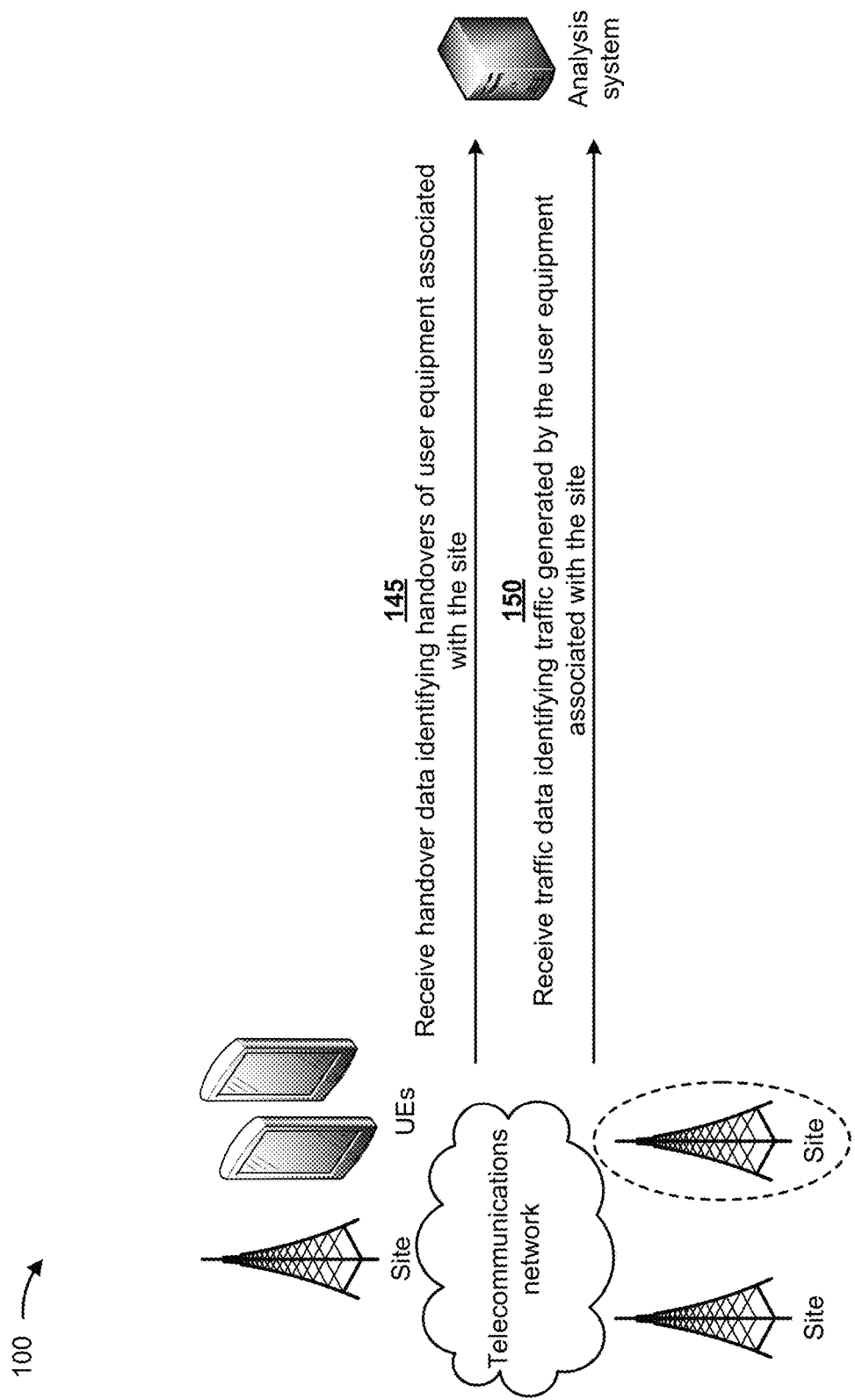

In some implementations, the capacity data includes handover data. As shown in FIG. 1G, and by reference number 145, the analysis system receives handover data identifying handovers of user equipment associated with the site. A handover may refer to a procedure performed by the site when user equipment is entering and/or exiting a coverage area (e.g., a cell) associated with the site. The handover procedure may transfer a communication session from a first site to a second site as the user equipment moves from a coverage area associated with the first site to a coverage area associated with the second site. The handover data may include information identifying a total quantity of times a handover was performed by the site, a quantity of times a handover procedure was performed to transfer a communication session to the site, and/or a quantity of times a handover procedure was performed to transfer a communication session from the site to another site.

In some implementations, the analysis system identifies one or more portions of handover data associated with each user equipment based on the handover data. The analysis system may analyze the handover data and may identify user equipment associated with each portion of the handover data. The analysis system may group portions of the handover data based on the user equipment with which the portions of the handover data are associated. The analysis system may assign each group of portions of handover data a unique identifier. In this way, the analysis system may enable large amounts of handover data to be efficiently analyzed thereby conserving computing resources, networking resources, human resources, and/or the like.

In some implementations, the capacity data includes traffic data. As shown by reference number 150, the analysis system receives traffic data identifying traffic generated by the user equipment associated with the site. The traffic data may include information identifying a total volume of traffic generated by the user equipment, a frequency band associated with the traffic generated by the user equipment, and/or the like.

In some implementations, the analysis system identifies one or more portions of traffic data associated with each user equipment based on the traffic data. The analysis system may analyze the traffic data and may identify user equipment associated with each portion of the traffic data. The analysis system may group portions of the traffic data based on the user equipment the portions of the traffic data are associated with. In this way, the analysis system may enable large amounts of traffic data to be efficiently analyzed thereby conserving computing resources, networking resources, human resources, and/or the like.

Figure 1H:
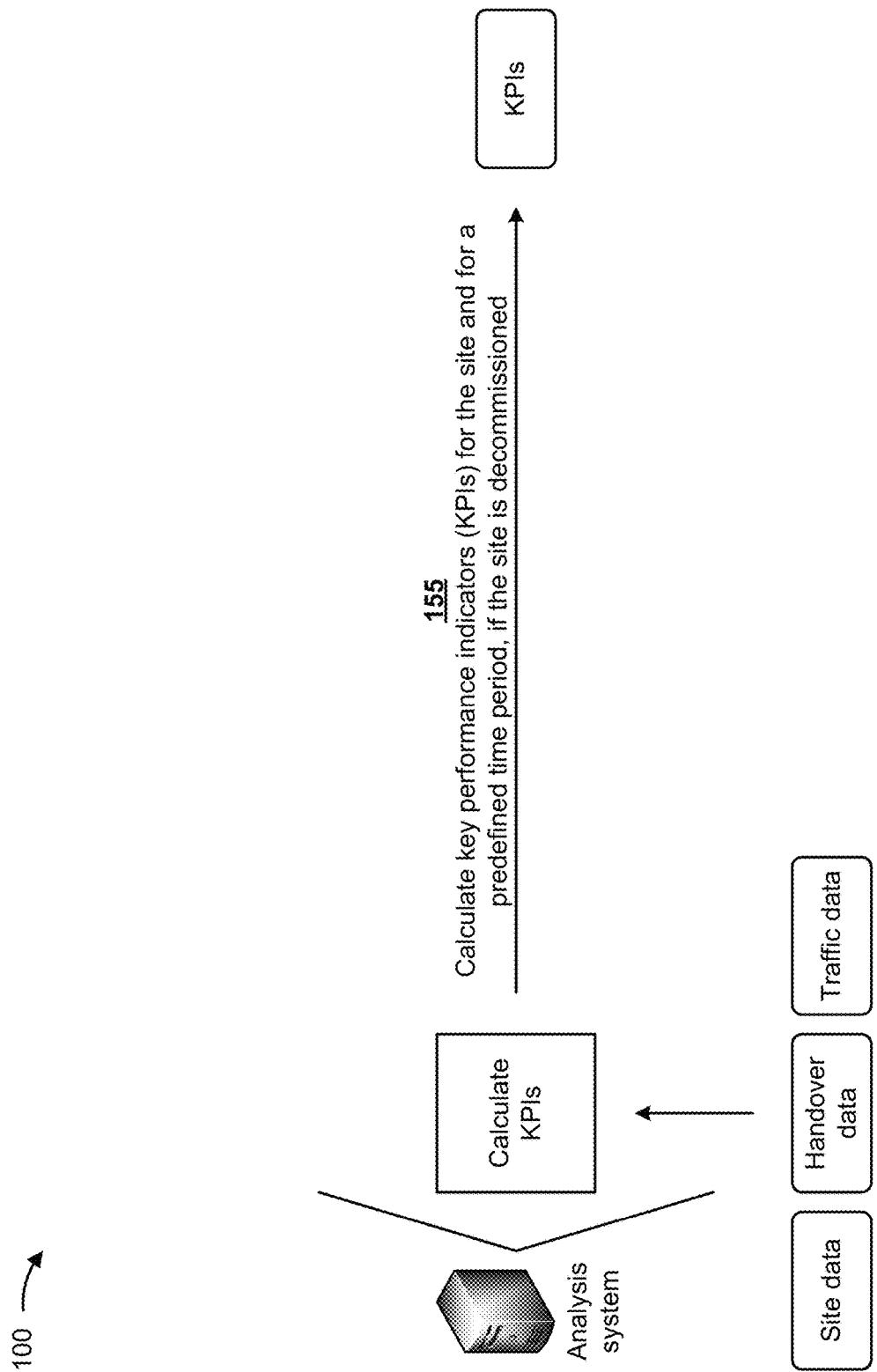

As shown in FIG. 1H, and by reference number 155, the analysis system calculates KPIs for the site and for a predefined time period, if the site is decommissioned. For example, the analysis system may calculate the KPIs for the site for a day, a week, a month, and/or the like. The KPIs may provide an indication of a capacity associated with the site. In some implementations, the KPIs include a resource block utilization KPI, a scheduled user equipment uplink KPI, a peak scheduled user equipment downlink KPI, and/or the like.

In some implementations, the analysis system calculates the KPIs based on the traffic data. In some implementations, the traffic data may include traffic data transmitted over a plurality of frequency bands (e.g., 700 MHz, 800 MHz, 1.5 GHz, and/or the like). The analysis system may generate a mapping that includes a table that associates the traffic data with the frequency bands over which the traffic data was transmitted. The analysis system may calculate the KPIs based on the mapping.

For example, the analysis system may calculate the resource block utilization KPI for the plurality of frequency bands based on the groups of portions of the traffic data. The analysis system may determine a resource block utilization for the user equipment based on the group of portions of the traffic data associated with the user equipment. In some implementations, the analysis system determines the resource block utilization KPI based on an average resource block utilization. The analysis system may determine one or more portions of the traffic data associated with a portion of the predetermined time period (e.g., one or more days, one or more weeks, and/or the like) and indicating a highest quantity of resource block allocations relative to other portions of the traffic data. The analysis system may determine an average resource block allocation based on the resource block allocations for the one or more portions of the traffic data. The analysis system may determine the resource block allocation KPI based on the average resource block allocation.

In some implementations, the analysis system may calculate a scheduled user equipment uplink KPI based on the traffic data. The scheduled user equipment uplink KPI may indicate a quantity of resource blocks scheduled to user equipment to enable the user equipment to transmit traffic on an uplink. In some implementations, the analysis system may determine the scheduled user equipment uplink KPI based on the groups of portions of the traffic data and/or based on an average quantity of resource blocks scheduled to user equipment to enable the user equipment to transmit traffic on the uplink. The analysis system may determine the scheduled user equipment uplink KPI based on the groups of portions of the traffic data and/or based on an average quantity of resource blocks scheduled to user equipment to enable the user equipment to transmit traffic on the uplink in a manner similar to that described above with respect to determining the resource block allocation KPI.

In some implementations, the analysis system may calculate a peak scheduled user equipment downlink KPI based on the traffic data. The peak scheduled user equipment downlink KPI may indicate a highest quantity of resource blocks scheduled to user equipment to enable the user equipment to transmit traffic on a downlink during the predetermined period of time. In some implementations, the analysis system may determine the peak scheduled user equipment downlink KPI based on the groups of portions of the traffic data and/or based on an average highest quantity of resource blocks scheduled to user equipment to enable the user equipment to transmit traffic on the downlink. The analysis system may determine the peak scheduled user equipment downlink KPI based on the groups of portions of the traffic data and/or based on an average highest quantity of resource blocks scheduled to user equipment to enable the user equipment to transmit traffic on the downlink in a manner similar to that described above with respect to determining the resource block allocation KPI.

In some implementations, the analysis system calculates KPIs based on the handover data. In some implementations, the handover data may include traffic data transmitted over the plurality of frequency bands. The analysis system may generate a mapping that includes a table that associates the handover data with the frequency bands over which the handover process was performed. The mapping may include data identifying the site, a band associated with the site, a cell identifier associated with the site, other sites to which handovers are made, other bands associated with the other sites, other cell identifiers associated with the other sites, and/or the like. The analysis system may calculate a quantity of handover attempts based on the handover mapping. The analysis system may calculate the plurality of KPIs based on the quantity of handover attempts.

Figure 1I:
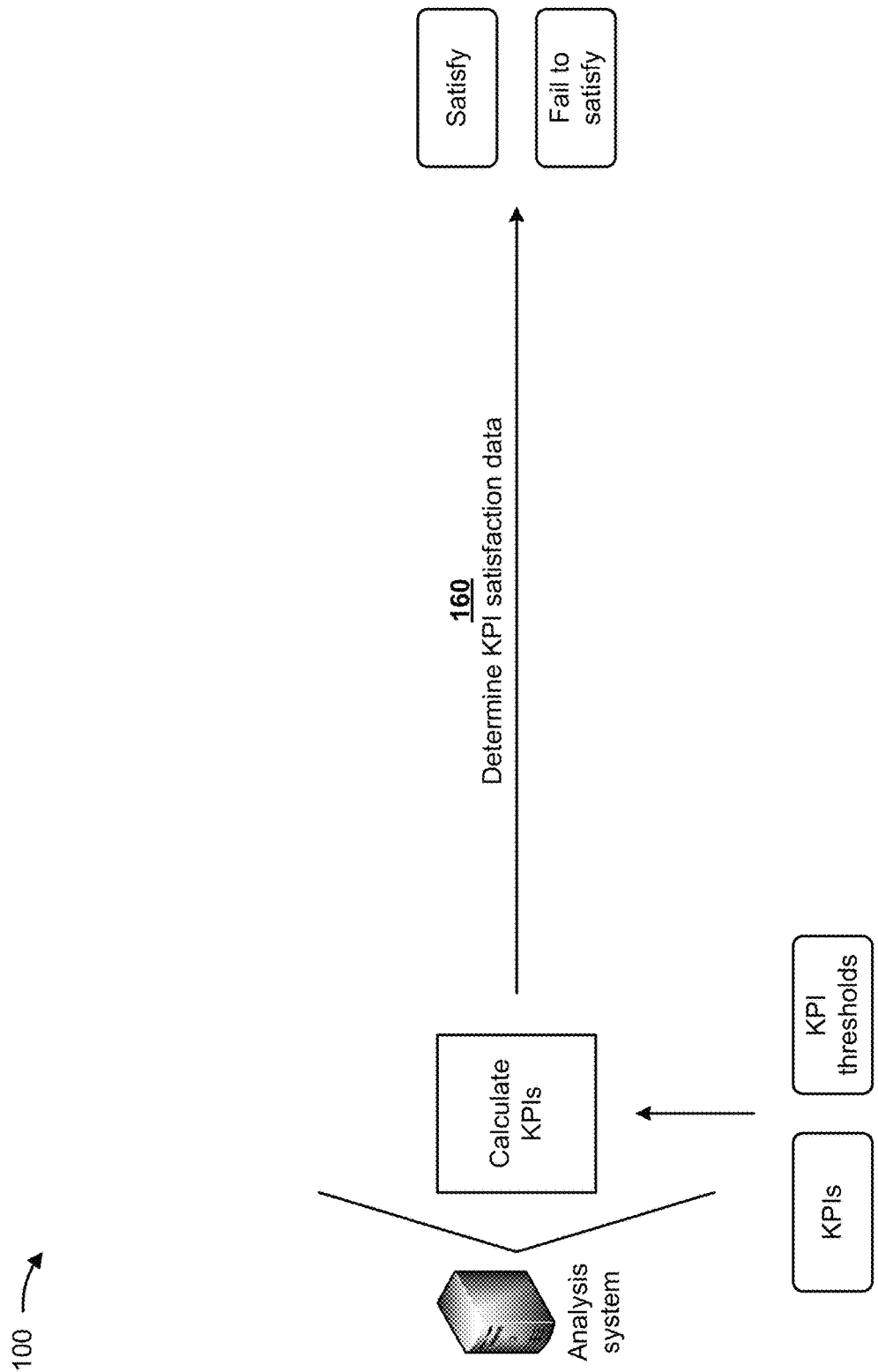

As shown in FIG. 1I, and by reference number 160, the analysis system determines KPI satisfaction data. The KPI satisfaction data may include data identifying whether one or more of the KPIs satisfy one or more of a plurality of KPI thresholds. The analysis system may determine whether a KPI satisfies a KPI threshold associated with the KPI. The KPI satisfaction data may include information indicating whether the KPI satisfied the KPI threshold. For example, the analysis system may determine whether the resource block allocation KPI satisfies a resource block allocation KPI threshold, whether the scheduled user equipment uplink KPI satisfies a scheduled user equipment uplink KPI threshold, whether the peak scheduled user equipment downlink KPI satisfies a peak scheduled user equipment downlink KPI threshold, and/or the like.

Figure 1J:
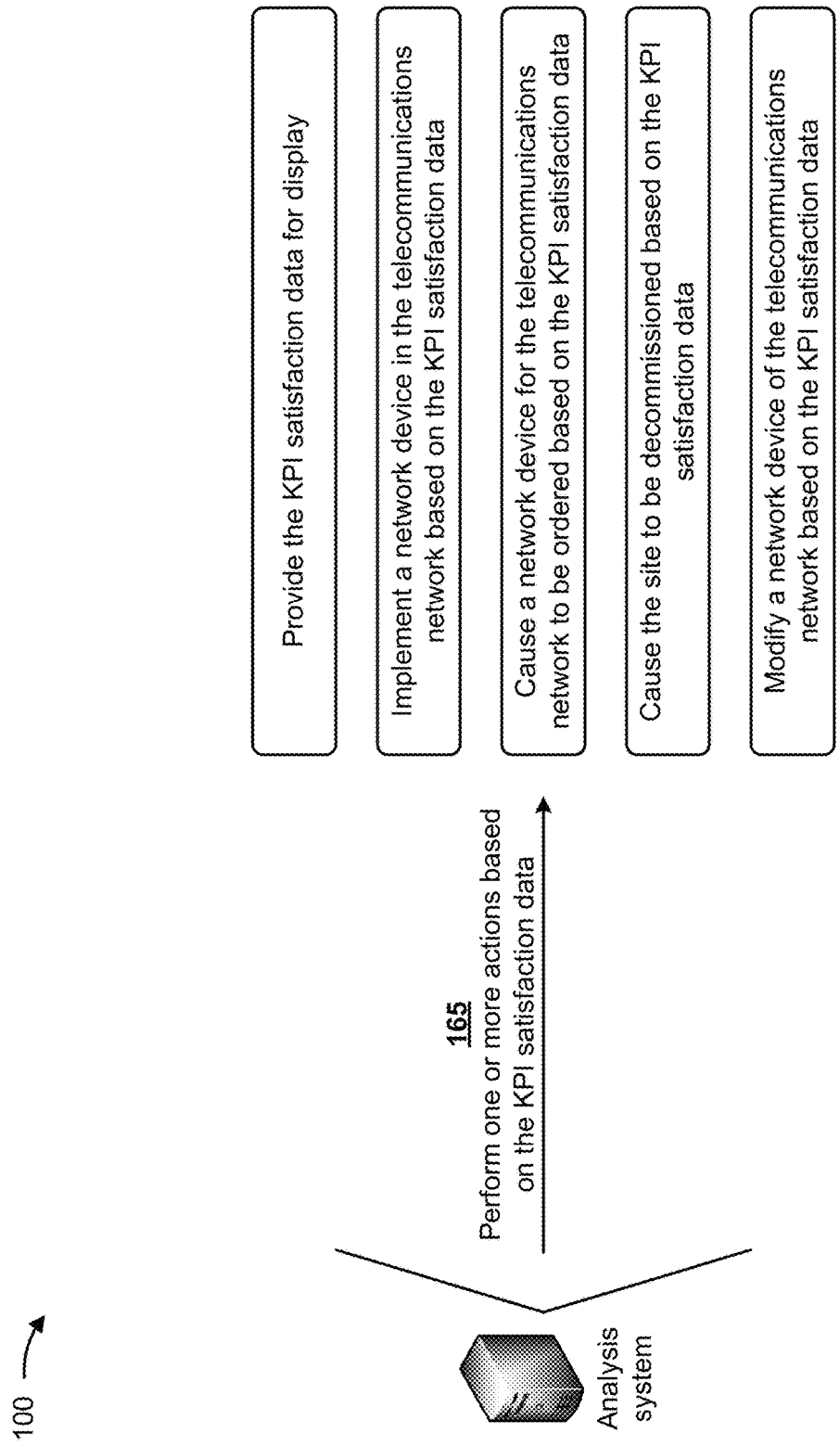

As shown in FIG. 1J, and by reference number 165, the analysis system performs one or more actions based on the KPI satisfaction data. In some implementations, the one or more actions include providing the KPI satisfaction data for display. For example, the analysis system may provide the KPI satisfaction data for display to a user.

In some implementations, the one or more actions include implementing a network device in the telecommunications network and/or causing a network device to be ordered based on the KPI satisfaction data. The analysis system may determine that a KPI does not satisfy a KPI threshold. The analysis system may determine that a network device is to be implemented in the telecommunications network based on the KPI failing to satisfy the KPI threshold. The analysis may provide information indicating that the KPI fails to satisfy the KPI threshold and/or information indicating a network device is to be ordered and/or implemented in the telecommunications network.

In some implementations, the one or more actions include causing the site to be decommissioned based on the KPI satisfaction data. The analysis system may determine that a KPI satisfies a KPI threshold associated with the KPI. The analysis system may cause the site to be decommissioned based on the KPI satisfying the KPI threshold associated with the KPI.

In some implementations, the one or more actions include modifying a network device of the telecommunications network based on the KPI satisfaction data. In some implementations, the modification may be made to a network device that is within a predetermined geographical distance of the site. The analysis system may identify a network device within the predetermined geographical distance of the site and may cause one or more antennas of the network device to be adjusted to compensate for decommissioning of the site.

For example, the analysis system may identify a network device that can be modified to increase a coverage area of the network device, increase a capacity of the telecommunications network, and/or the like. The analysis system may cause a position of an antenna of the network device to be altered (e.g., moved horizontally, moved vertically, and/or the like), may cause a power output of the network device to be modified (e.g., increased to improve a signal strength at a location point, decreased to reduce interference, and/or the like), may cause additional equipment to be installed on the network device (e.g., to increase a capacity of the network device, to increase a coverage area of the network device, and/or the like), and/or the like. In this way, the analysis system may allow a telecommunications network to be modified automatically thereby conserving computing resources, human resources, and/or the like.

In some implementations, the one or more actions include generating a visualization associated with the site based on the KPI satisfaction data. The visualization may include indicators for sites of the telecommunications network and an indicator, for the site, that is modified based on the KPI satisfaction data. The analysis system may provide the visualization for display.

By utilizing the systems and methods described herein, the analysis system may efficiently and effectively analyze the large amounts of data obtained by a network provider to determine an effect decommissioning a site will have on a user's network experience and actions to be taken to provide the same or better network experience to users after a site is decommissioned. Thus, the analysis system may utilize fewer computing resources, networking resources, human resources, and/or the like relative to other systems used to determine the effect decommissioning a site will have on a user's network experience and actions to be taken to provide the same or better network experience to users after the site is decommissioned.

As indicated above, FIGS. 1A-1J are provided as an example. Other examples may differ from what is described with regard to FIGS. 1A-1J. The number and arrangement of devices shown in FIGS. 1A-1J are provided as an example. In practice, there may be additional devices, fewer devices, different devices, or differently arranged devices than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) shown in FIGS. 1A-1J may perform one or more functions described as being performed by another set of devices shown in FIGS. 1A-1J.

Figure 2:
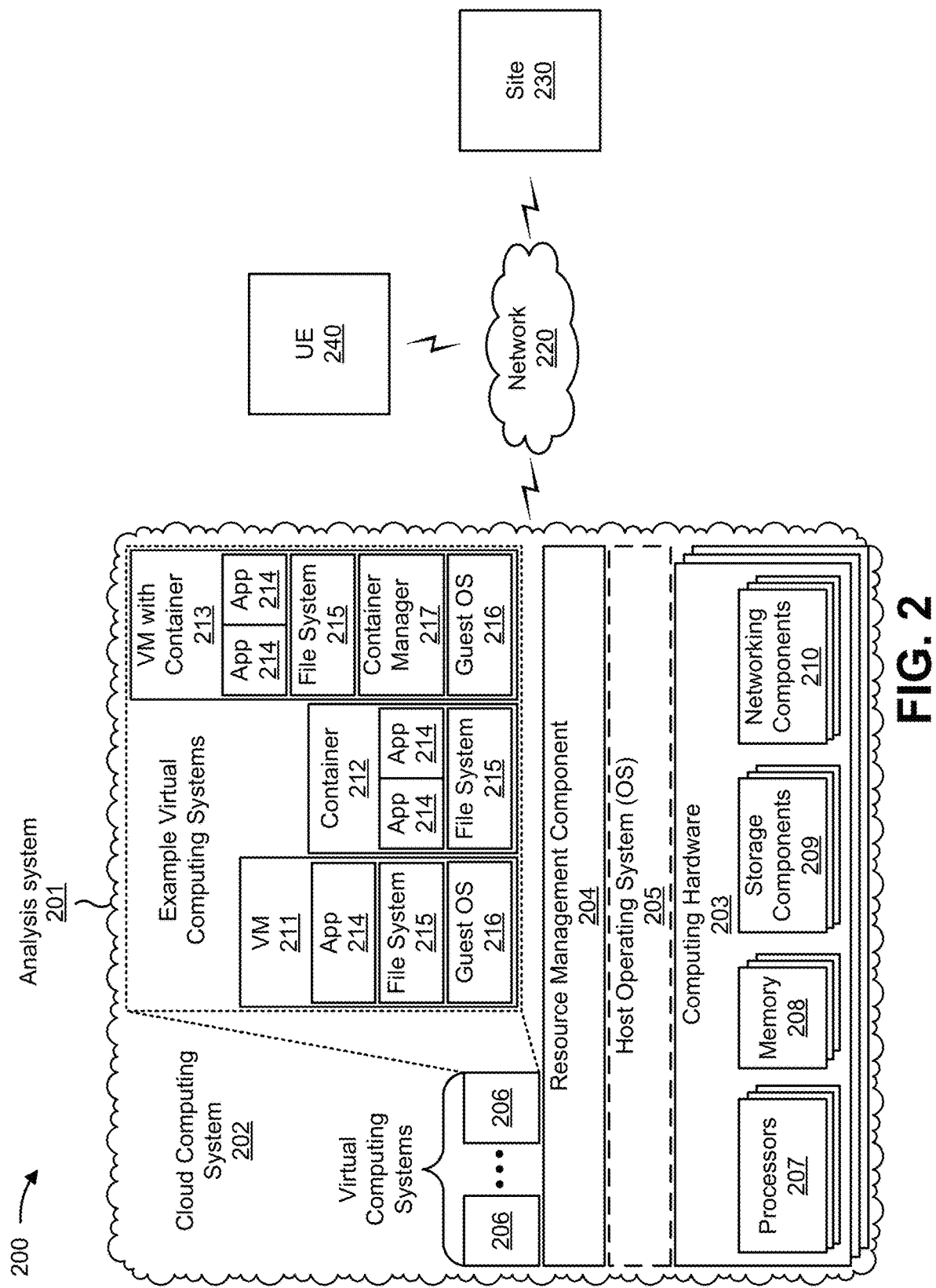
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a analysis system 201, which may include one or more elements of and/or may execute within a cloud computing system 202. The cloud computing system 202 may include one or more elements 203-213, as described in more detail below. As further shown in FIG. 2, environment 200 may include a network 220, a site 230, and/or user equipment 240. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the analysis system 201 may include one or more elements 203-213 of the cloud computing system 202, may execute within the cloud computing system 202, and/or may be hosted within the cloud computing system 202, in some implementations, the analysis system 201 may not be cloud-based (e.g., may be implemented outside of a cloud computing system) or may be partially cloud-based. For example, the analysis system 201 may include one or more devices that are not part of the cloud computing system 202, such as device 300 of FIG. 3, which may include a stand-alone server or another type of computing device. The analysis system 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or the like, and/or a combination of these or other types of networks. The network 220 enables communication among the devices of environment 200.

Site 230 includes one or more devices capable of communicating with user equipment using a cellular Radio Access Technology (RAT). For example, site 230 may include a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, and/or the like. Site 230 may transfer traffic between user equipment (e.g., using a cellular RAT), other sites 230 (e.g., using a wireless interface or a backhaul interface, such as a wired backhaul interface), and/or network 220. Site 230 may provide one or more cells that cover geographic areas. Some sites 230 may be mobile sites 230. Some sites 230 may be capable of communicating using multiple RATs User equipment 240 includes one or more devices capable of receiving, generating, storing, processing, and/or providing information associated with a communication network provider device, as described elsewhere herein. User equipment 240 may include a communication device and/or a computing device. For example, user equipment 240 may include a wireless communication device, a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. User equipment 240 may communicate with one or more other devices of environment 200, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
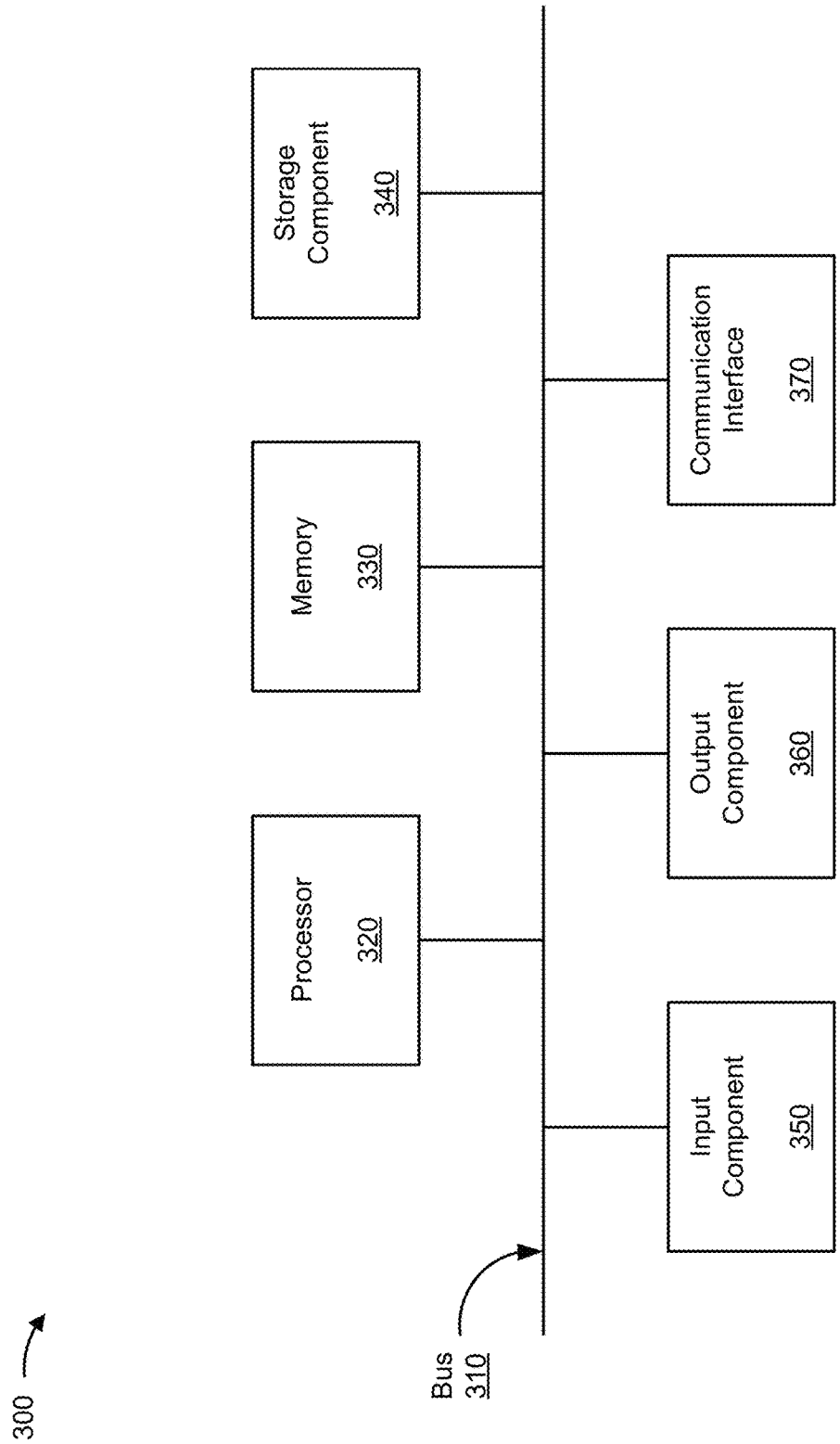
FIG. 3 is a diagram of example components of one or more devices of FIG. 2.

FIG. 3 is a diagram of example components of a device 300, which may correspond to analysis system 201, site 230, and/or user equipment 240. In some implementations, analysis system 201, site 230, and/or user equipment 240 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory), a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, and/or the like. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
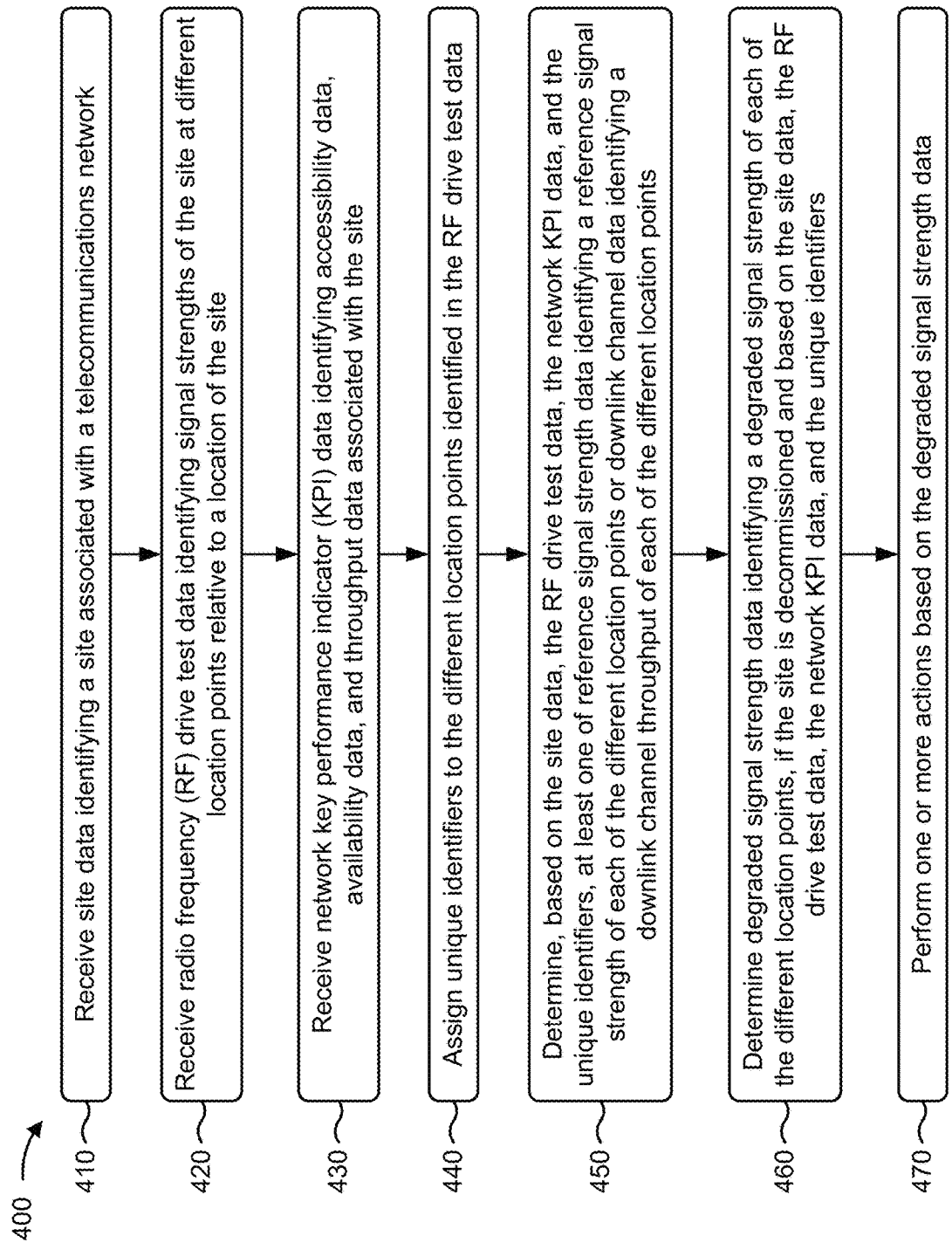
FIG. 4 is a flow chart of example processes relating to analyzing a communication network device, based on a coverage analysis associated with decommissioning the communication network device, to determine next actions.

FIG. 4 is a flow chart of an example process 400 associated with analyzing a communication network device, based on coverage analyses associated with decommissioning the communication network device, to determine next actions. In some implementations, one or more process blocks of FIG. 4 may be performed by a device (e.g., analysis system 201). In some implementations, one or more process blocks of FIG. 4 may be performed by another device or a group of devices separate from or including the device, such as site 230, user equipment 240, and/or the like. Additionally, or alternatively, one or more process blocks of FIG. 4 may be performed by one or more components of a device 300, such as processor 320, memory 330, storage component 340, input component 350, output component 360, communication component 370, and/or the like.

As shown in FIG. 4, process 400 may include receiving site data identifying a site associated with a telecommunications network (block 410). For example, the device may receive site data identifying a site associated with a telecommunications network, as described above.

As further shown in FIG. 4, process 400 may include receiving radio frequency (RF) drive test data identifying signal strengths of the site at different location points relative to a location of the site (block 420). For example, the device may receive radio frequency (RF) drive test data identifying signal strengths of the site at different location points relative to a location of the site, as described above.

As further shown in FIG. 4, process 400 may include receiving network key performance indicator (KPI) data identifying accessibility data, availability data, and throughput data associated with the site (block 430). For example, the device may receive network key performance indicator (KPI) data identifying accessibility data, availability data, and throughput data associated with the site, as described above.

As further shown in FIG. 4, process 400 may include assigning unique identifiers to the different location points identified in the RF drive test data (block 440). For example, the device may assign unique identifiers to the different location points identified in the RF drive test data, as described above.

As further shown in FIG. 4, process 400 may include determining, based on the site data, the RF drive test data, the network KPI data, and the unique identifiers, at least one of reference signal strength data identifying a reference signal strength of each of the different location points or downlink channel data identifying a downlink channel throughput of each of the different location points (block 450). For example, the device may determine, based on the site data, the RF drive test data, the network KPI data, and the unique identifiers, at least one of reference signal strength data identifying a reference signal strength of each of the different location points or downlink channel data identifying a downlink channel throughput of each of the different location points, as described above.

As further shown in FIG. 4, process 400 may include determining degraded signal strength data identifying a degraded signal strength of each of the different location points, if the site is decommissioned and based on the site data, the RF drive test data, the network KPI data, and the unique identifiers (block 460). For example, the device may determine degraded signal strength data identifying a degraded signal strength of each of the different location points, if the site is decommissioned and based on the site data, the RF drive test data, the network KPI data, and the unique identifiers, as described above.

As further shown in FIG. 4, process 400 may include performing one or more actions based on the degraded signal strength data (block 470). For example, the device may perform one or more actions based on the degraded signal strength data, as described above.

Process 400 may include additional implementations, such as any single implementation or any combination of implementations described below and/or in connection with one or more other processes described elsewhere herein.

In a first implementation, performing the one or more actions comprises one or more of: providing the degraded signal strength data for display; implementing one or more network devices in the telecommunications network based on the degraded signal strength data; or causing one or more network devices for the telecommunications network to be ordered based on the degraded signal strength data.

In a second implementation, alone or in combination with the first implementation, performing the one or more actions comprises one or more of: generating, and providing for display, a map that includes the degraded signal strength of each of the different location points; causing the site to be decommissioned based on the degraded signal strength data; or modifying one or more network devices of the telecommunications network based on the degraded signal strength data.

In a third implementation, alone or in combination with one or more of the first and second implementations, the site includes a cell tower.

In a fourth implementation, alone or in combination with one or more of the first through third implementations, the RF drive test data includes data identifying one or more of: reference signal receive powers of the site at the different location points, signal-to-interference-plus-noise ratios of the site at the different location points, or received signal strength indicators of the site at the different location points.

In a fifth implementation, alone or in combination with one or more of the first through fourth implementations, process 400 includes determining a signal-to-interference-plus-noise ratio of each of the different location points if the site is decommissioned based on the reference signal strength of each of the different location points; and performing the one or more actions based on the signal-to-interference-plus-noise ratio of each of the different location points.

In a sixth implementation, alone or in combination with one or more of the first through fifth implementations, process 400 includes determining a signal quality category for each of the different location points based on the site data, the RF drive test data, the network KPI data, and the unique identifiers; and utilizing the signal quality category for each of the different location points when determining the reference signal strength data or the downlink channel data.

In a seventh implementation, alone or in combination with one or more of the first through sixth implementations, process 400 includes categorizing the reference signal strength data for different frequencies to identify one or more degradation conditions associated with reference signal strength data; and determining the degraded signal strength data based on the one or more degradation conditions.

In an eighth implementation, alone or in combination with one or more of the first through seventh implementations, process 400 includes categorizing the downlink channel data for different frequencies to identify one or more degradation conditions associated with the downlink channel data; and determining the degraded signal strength data based on the one or more degradation conditions.

In a ninth implementation, alone or in combination with one or more of the first through eighth implementations, process 400 includes generating a map that includes the degraded signal strength of each of the different location points and the reference signal strength of each of the different location points; and providing the map for display.

In a tenth implementation, alone or in combination with one or more of the first through ninth implementations, process 400 includes generating a map that includes the degraded signal strength of each of the different location points and the downlink channel throughput of each of the different location points; and providing the map for display.

In an eleventh implementation, alone or in combination with one or more of the first through tenth implementations, process 400 includes determining whether the reference signal strength of each of the different location points satisfies one or more thresholds indicating qualities of signal strength; and categorizing the reference signal strength data based on determining whether the reference signal strength of each of the different location points satisfies the one or more thresholds indicating qualities of signal strength.

In a twelfth implementation, alone or in combination with one or more of the first through eleventh implementations, process 400 includes determining whether the downlink channel throughput of each of the different location points satisfies one or more thresholds indicating qualities of channel throughput; and categorizing the downlink channel data based on determining whether the downlink channel throughput of each of the different location points satisfies one or more thresholds indicating qualities of channel throughput.

In a thirteenth implementation, alone or in combination with one or more of the first through twelfth implementations, performing the one or more actions includes one or more of: providing the degraded signal strength data for display; implementing one or more network devices in the telecommunications network based on the degraded signal strength data; causing one or more network devices for the telecommunications network to be ordered based on the degraded signal strength data; generating, and providing for display, a map that includes the degraded signal strength of each of the different location points; causing the site to be decommissioned based on the degraded signal strength data; or modifying one or more network devices of the telecommunications network based on the degraded signal strength data.

In a fourteenth implementation, alone or in combination with one or more of the first through thirteenth implementations, process 400 includes determining a signal quality category for each of the different location points based on the site data, the RF drive test data, the network KPI data, and the unique identifiers; and utilizing the signal quality category for each of the different location points when determining the reference signal strength data or the downlink channel data.

In a fifteenth implementation, alone or in combination with one or more of the first through fourteenth implementations, process 400 includes categorizing the reference signal strength data for different frequencies to identify one or more first degradation conditions associated with reference signal strength data; categorizing the downlink channel data for different frequencies to identify one or more second degradation conditions associated with the downlink channel data; and determining the degraded signal strength data based on the one or more first degradation conditions or the one or more second degradation conditions.

In a sixteenth implementation, alone or in combination with one or more of the first through fifteenth implementations, process 400 includes generating a map that includes the degraded signal strength of each of the different location points and the reference signal strength of each of the different location points; and providing the map for display.

In a seventeenth implementation, alone or in combination with one or more of the first through sixteenth implementations, process 400 includes determining whether the reference signal strength of each of the different location points satisfies one or more thresholds indicating qualities of signal strength; and categorizing the reference signal strength data based on determining whether the reference signal strength of each of the different location points satisfies the one or more thresholds indicating qualities of signal strength.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, site data identifying a site associated with a telecommunications network;
   receiving, by the device, radio frequency (RF) drive test data identifying signal strengths of the site at different location points relative to a location of the site;
   receiving, by the device, network key performance indicator (KPI) data identifying accessibility data, availability data, and throughput data associated with the site;
   assigning, by the device, unique identifiers to the different location points identified in the RF drive test data;
   determining, by the device and based on the site data, the RF drive test data, the network KPI data, and the unique identifiers, at least one of reference signal strength data identifying a reference signal strength of each of the different location points or downlink channel data identifying a downlink channel throughput of each of the different location points;
   determining, by the device and based on the site data, the RF drive test data, the network KPI data, and the unique identifiers, degraded signal strength data identifying a degraded signal strength of each of the different location points; and
   performing, by the device, one or more actions based on the degraded signal strength data, wherein the one or more actions comprise:
      generating a map that includes representation of the degraded signal strength data and the reference signal strength data; and
      providing the map for display.

2. The method of claim 1, wherein performing the one or more actions comprises one or more of:
   providing the degraded signal strength data for display;
   implementing one or more first network devices in the telecommunications network based on the degraded signal strength data; or
   causing one or more second network devices for the telecommunications network to be ordered based on the degraded signal strength data.

3. The method of claim 1, wherein performing the one or more actions comprises one or more of:
   generating, and providing for display, information that includes the degraded signal strength of each of the different location points;
   causing the site to be decommissioned based on the degraded signal strength data; or
   modifying one or more network devices of the telecommunications network based on the degraded signal strength data.

4. The method of claim 1, wherein the site includes a cell tower.

5. The method of claim 1, wherein the RF drive test data includes data identifying one or more of:
   reference signal receive powers of the site at the different location points,
   signal-to-interference-plus-noise ratios of the site at the different location points, or
   received signal strength indicators of the site at the different location points.

6. The method of claim 1, further comprising:
   determining a signal-to-interference-plus-noise ratio of each of the different location points based on the reference signal strength of each of the different location points; and
   performing the one or more actions based on the signal-to-interference-plus-noise ratio of each of the different location points.

7. The method of claim 1, further comprising:
   determining a signal quality category for each of the different location points based on the site data, the RF drive test data, the network KPI data, and the unique identifiers; and
   utilizing the signal quality category for each of the different location points when determining the reference signal strength data or the downlink channel data.

8. A device, comprising:
   one or more memories; and
   one or more processors, communicatively coupled to the one or more memories, configured to:
      receive site data identifying a site associated with a telecommunications network;
      receive radio frequency (RF) drive test data identifying signal strengths of the site at different location points relative to a location of the site;
      receive network key performance indicator (KPI) data identifying accessibility data, availability data, and throughput data associated with the site;
      assign unique identifiers to the different location points identified in the RF drive test data;
      determine a signal quality category for each of the different location points based on the site data, the RF drive test data, the network KPI data, and the unique identifiers;
      determine, based on the site data, the RF drive test data, the network KPI data, the unique identifiers, and the signal quality category for each of the different location points, at least one of reference signal strength data identifying a reference signal strength of each of the different location points or downlink channel data identifying a downlink channel throughput of each of the different location points;
      determine, based on the at least one of the reference signal strength data or the downlink channel data, degraded signal strength data identifying a degraded signal strength of each of the different location points; and
      perform one or more actions based on the degraded signal strength data, wherein the one or more actions comprise:
         generating a map that includes representation of the degraded signal strength data and the reference signal strength data; and
         providing the map for display.

9. The device of claim 8, wherein the one or more processors, when determining the degraded signal strength data identifying the degraded signal strength of each of the different location points, are configured to:

categorize the reference signal strength data for different frequencies to identify one or more degradation conditions associated with reference signal strength data; and determine the degraded signal strength data based on the one or more degradation conditions.

10. The device of claim 8, wherein the one or more processors, when determining the degraded signal strength data identifying the degraded signal strength of each of the different location points, are configured to:

categorize the downlink channel data for different frequencies to identify one or more degradation conditions associated with the downlink channel data; and determine the degraded signal strength data based on the one or more degradation conditions.

11. The device of claim 8, wherein the one or more processors, when performing the one or more actions, are configured to:

generate information that includes the degraded signal strength of each of the different location points and the downlink channel throughput of each of the different location points; and provide the information for display.

12. The device of claim 8, wherein the one or more processors are further configured to:

determine whether the reference signal strength of each of the different location points satisfies one or more thresholds indicating qualities of signal strength; and categorize the reference signal strength data based on determining whether the reference signal strength of each of the different location points satisfies the one or more thresholds indicating qualities of signal strength.

13. The device of claim 8, wherein the one or more processors are further configured to:

determine whether the downlink channel throughput of each of the different location points satisfies one or more thresholds indicating qualities of channel throughput; and categorize the downlink channel data based on determining whether the downlink channel throughput of each of the different location points satisfies the one or more thresholds indicating qualities of channel throughput.

14. A non-transitory computer-readable medium storing instructions, the instructions comprising:

one or more instructions that, when executed by one or more processors, cause the one or more processors to:

receive site data identifying a site associated with a telecommunications network;

receive radio frequency (RF) drive test data identifying signal strengths of the site at different location points relative to a location of the site, wherein the RF drive test data includes data identifying one or more of:

reference signal receive powers of the site at the different location points, signal-to-interference-plus-noise ratios of the site at the different location points, or received signal strength indicators of the site at the different location points;

receive network key performance indicator (KPI) data identifying accessibility data, availability data, and throughput data associated with the site;

assign unique identifiers to the different location points identified in the RF drive test data;

determine, based on the site data, the RF drive test data, the network KPI data, and the unique identifiers, at least one of reference signal strength data identifying a reference signal strength of each of the different location points or downlink channel data identifying a downlink channel throughput of each of the different location points;

determine, based on the at least one of the reference signal strength data or the downlink channel data, degraded signal strength data identifying a degraded signal strength of each of the different location points; and perform one or more actions based on the degraded signal strength data, wherein the one or more actions comprise:

generating a map that includes representation of the degraded signal strength data and the reference signal strength data; and providing the map for display.

15. The non-transitory computer-readable medium of claim 14, wherein the one or more instructions, that cause the one or more processors to perform the one or more actions, cause the one or more processors to one or more of:

implement one or more first network devices in the telecommunications network based on the degraded signal strength data, cause one or more second network devices for the telecommunications network to be ordered based on the degraded signal strength data, cause the site to be decommissioned based on the degraded signal strength data, or modify one or more third network devices of the telecommunications network based on the degraded signal strength data.

16. The non-transitory computer-readable medium of claim 14, wherein the one or more instructions, when executed by the one or more processors, further cause the one or more processors to:

determine a signal quality category for each of the different location points based on the site data, the RF drive test data, the network KPI data, and the unique identifiers; and utilize the signal quality category for each of the different location points when determining the reference signal strength data or the downlink channel data.

17. The non-transitory computer-readable medium of claim 14, wherein the one or more instructions, that cause the one or more processors to determine the degraded signal strength data identifying the degraded signal strength of each of the different location points, cause the one or more processors to:

categorize the reference signal strength data for different frequencies to identify one or more first degradation conditions associated with reference signal strength data;

categorize the downlink channel data for different frequencies to identify one or more second degradation conditions associated with the downlink channel data; and determine the degraded signal strength data based on the one or more first degradation conditions or the one or more second degradation conditions.

18. The non-transitory computer-readable medium of claim 14, wherein the one or more instructions, that cause the one or more processors to perform the one or more actions, cause the one or more processors to:

generate information that includes the degraded signal strength of each of the different location points and the reference signal strength of each of the different location points; and provide the information for display.

19. The non-transitory computer-readable medium of claim 14, wherein the one or more instructions, when executed by the one or more processors, further cause the one or more processors to:
- determine whether the reference signal strength of each of the different location points satisfies one or more thresholds indicating qualities of signal strength; and
- categorize the reference signal strength data based on determining whether the reference signal strength of each of the different location points satisfies the one or more thresholds indicating qualities of signal strength.

20. The non-transitory computer-readable medium of claim 14, wherein the one or more instructions, when executed by the one or more processors, further cause the one or more processors to:
- determine whether the downlink channel throughput of each of the different location points satisfies one or more thresholds indicating qualities of channel throughput; and
- categorize the downlink channel data based on determining whether the downlink channel throughput of each of the different location points satisfies the one or more thresholds indicating qualities of channel throughput.

* * * * *